United States Patent Office 3,720,094
Patented Mar. 13, 1973

3,720,094
AUTOCLAVE FOR PRESSURE JUMP RELAXATION MEASUREMENT
Wilhelm Knoche, Gottingen, Germany, assignor to Max-Planck-Gesellschaft zur Forderung der Wissenschaften e.V.
Filed July 27, 1971, Ser. No. 166,490
Claims priority, application Germany, Aug. 4, 1970, G 70 29 349.1
Int. Cl. G01m 3/02
U.S. Cl. 73—37    11 Claims

ABSTRACT OF THE DISCLOSURE

An autoclave for pressure jump measurements comprises a body affording a pressure chamber having an open top closed by a rupture disc which is pressed against the margin of the chamber by a clamping ring held by a readily releasable closure. The pressure chamber has a floor spaced from the rupture disc by a narrow gap communicating with a supply of pressure medium, the floor having in it two wells each containing a resistance cell.

---

The present invention relates to an autoclave for pressure jump relaxation measurements with a pressure chamber containing two resistance measuring cells, and having an open top closed by a rupture disc.

Pressure jump processes, and autoclaves suitable for carrying them out, are known for example from Zeitschrift für Elektrochemie, 63 (1959), 454–461; Inorganic Chemistry, 2 (1963), 6–10.

In the known autoclaves the pressure chamber is divided by a polyethylene membrane into two spaces. The first space consists in a recess in the pressure chamber element which is substantially cylindrical, which receives a tubular base on which the resistance measuring cells are mounted, and which in operation is filled with a pressure-transmitting fluid, e.g. xylol. The other space is formed by an intermediate ring, which presses the polyethylene membrane on the actual pressure chamber element and is closed at the top by the rupture disc, which is pressed by a clamping ring on to the intermediate ring. The entire arrangement is held together by means of several bolts and nuts. The pressure medium supply duct opens out into the space between the polyethylene membrane and the rupture disc.

In the known autoclaves the rupture disc is burst by means of a needle which falls from a predetermined height on to the middle of the disc. At the same time the contact of the point of the needle with the rupture disc is used for triggering the time deflection of an oscillograph used to display the results.

An object of the present invention is to provide an autoclave for pressure jump relaxation measurements by means of which it is possible to carry out measurements more simply and more accurately than with the known autoclaves, and for the operation of which no highly-skilled personnel is necessary.

According to the invention an autoclave for pressure jump measurements comprises a body affording a pressure chamber having an open top closed by a rupture disc which is pressed against the margin of the chamber by a clamping ring held by a readily releasable closure, in which the pressure chamber has a floor spaced from the rupture disc by a narrow gap communicating with a supply of pressure medium, the floor having in it two wells each containing a resistance cell.

In the present autoclave only a minimum amount of pressure medium is required, and when the rupture disc bursts practically no oscillations can arise in the pressure medium. The autoclave is easily and quickly filled and again emptied.

Figure 1:
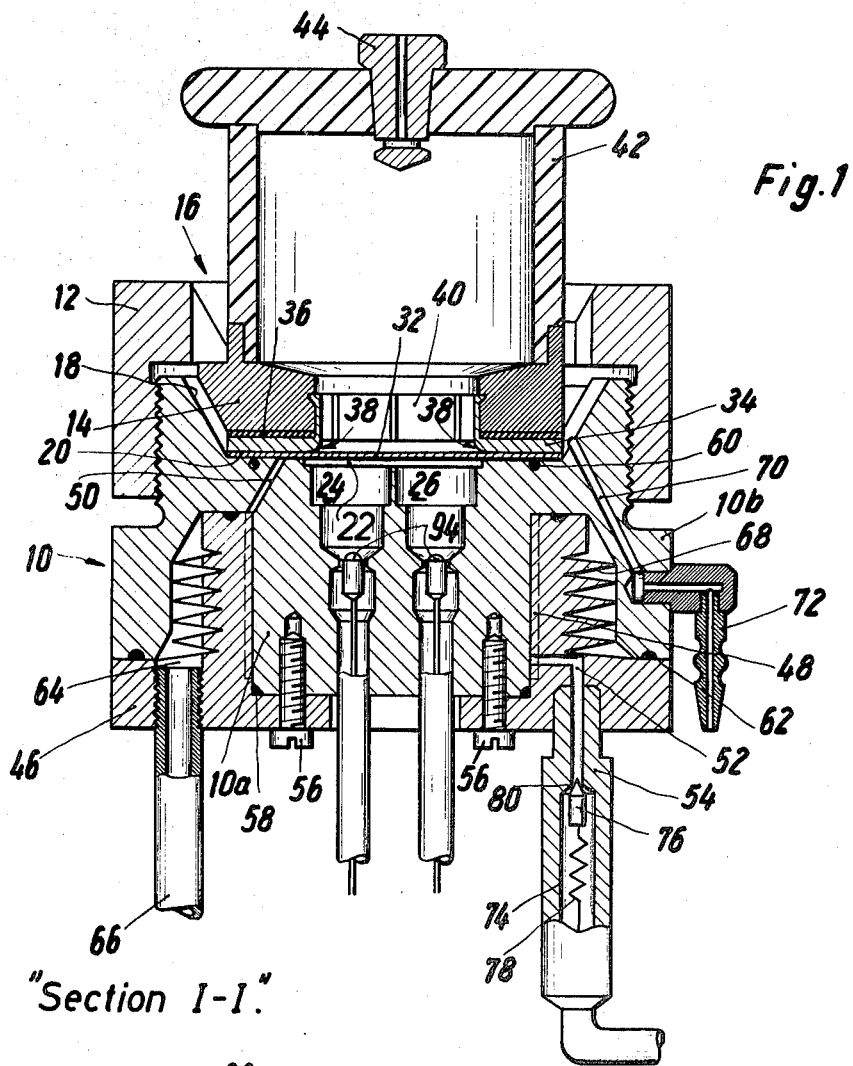
Figure 3:
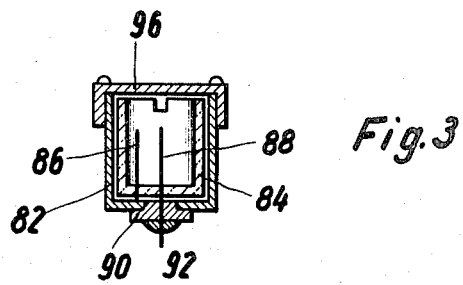
Figure 2:
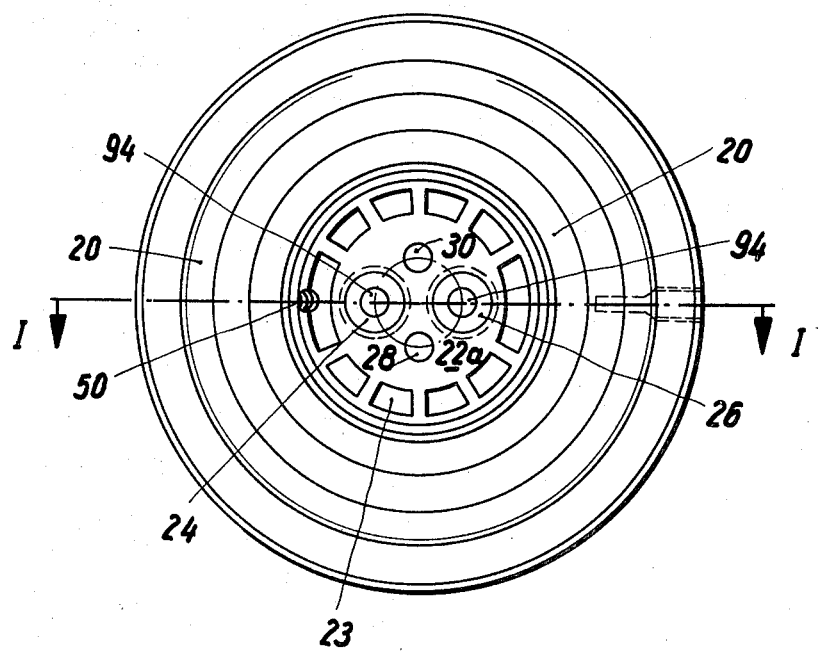

Further features of the invention will be apparent from the following description of one embodiment, given by way of example, with reference to the accompanying drawings, in which:

FIG. 1 is a simplified sectional elevation through an autoclave according to the invention;
FIG. 2 is a plan view of the pressure chamber body, and
FIG. 3 is a sectional elevation on an enlarged scale, of a resistance measuring cell for the autoclave of FIG. 1.

FIGS. 1 and 2 show an autoclave comprising a pressure chamber body 10 on which a union nut 12 is screwed, to secure a clamping ring 14 affording a bayonet closure denoted by 16, which may be formed and function in known manner.

The pressure chamber body 10 has at the top a frusto-conical recess 18 the bottom of which is generally flat and affords an annular plain seating surface 20 adjoining the frusto-conical wall, and, within the seating surface, a shallow recess 22 in which four generally cylindrical wells 24, 26, 28 and 30 (FIG. 2) are formed. Each well has an insulated coaxial electrical connection extending through its bottom. This is formed and sealed in known manner, and it is thought unnecessary to describe it in detail.

The open top of the pressure chamber formed by the wells 24 to 30 is closed by a rupture disc 32 which is pressed by the clamping ring 14 through an intermediate ring 34 and a sealing ring 36 of polytetrafluoroethylene, against the annular surface 20 which surrounds the opening of the pressure chamber.

The edge of the central opening of the intermediate ring 34 is rounded off on the side facing the rupture disc 32, as shown at 38. The intermediate ring 34 is also provided with a slotted collar 40, having at its upper edge a rib which springs into a corresponding annular groove of the clamping ring 14, so that on releasing the bayonet closure the intermediate ring 34 and the seal 36 are removed at the same time as the clamping ring 14.

The upper end of the clamping ring 14 carries an overflow tank 42, which may be made of transparent plastic and has a venting pot 44, to prevent spraying of the pressure medium escaping when the rupture disc 32 bursts.

The lower part of the pressure chamber body 10 has in it an annular recess to form a cooling chamber between an inner boss portion 10a and an outer skirt portion 10b. Fitting into, and closing the lower end of, this annular recess is a cooling sleeve 46, the inner wall of which abuts that of the boss portion 10a and has in it a spiral groove 48, which forms a portion of the pressure medium supply duct. At the top, the groove communicates via a channel 50 with the cavity 22. FIG. 2 shows the lands 23 around which the channel 50 communicates with the cavity 22, these lands being in the form of a ring of arcuate raised portions projecting up from the floor of the pressure chamber body around the wells containing the resistance measuring cells to meet the surface of the rupture disc 32. The bottom end of the groove 48 is connected via a channel 52 in the cooling element with a pressure medium supply pipe 54, which contains a shut-off valve 74. This comprises a valve member acted on by a tension spring 78 which normally holds it open but allows it to close if the rate of flow through it exceeds a predetermined value.

The cooling sleeve 46 is held in place by screws 56 and is sealed by O-rings 58, 60 and 62 to form a sealed pressure medium supply duct and a cooling chamber 64, through which a cooling medium, e.g. water or alcohol, may be passed. The supply and removal of the cooling medium is effected by means of two axial pipe connections 66, of which only one is shown, and which open into the cooling chamber 64 on opposite sides of a diametral partition (not shown). To ensure good heat exchange between the cooling medium and the cooling sleeve, the latter is provided on the outside with cooling fins 68.

The pressure medium collector tank formed by the recess 18 is connected via an outflow channel 70 with a hose connection 72. The outflow channel 70 passes through the skirt portion 10b of the pressure chamber body.

Each of the cavities 24 and 26 is designed to receive a resistance cell which, as shown in FIG. 3, contains a cylindrical casing 82 of super-refined steel with an external thread which can be screwed into a corresponding internal thread in the narrow bottom portion of the cavity 24 or 26. In the inside of the super-refined steel casing there is a glass bowl 84 with two electrodes 86 and 88 which pass through the wall of the glass bowl 84. The electrode 86 makes contact with the super-refined steel casing 82, while the electrode 88 is insulated from the super-refined steel casing 82 by means of an insulating disc 90 and is connected with a contact 92 which, when the resistance cell is screwed in, makes contact with a corresponding contact 94 at the bottom of the corresponding cavity 24 or 26. The resistance cell may be closed by a plastic cap 96, which may consist for example of polytrifluoromonofluoroethylene.

The cavities 28 and 30 contain respectively a pressure gauge and a temperature gauge, which may consist, for example, of a piezo-electric quartz or a thermistor or a NTC resistance.

For heat insulation, the whole arrangement may be further surrounded by a PVC casing (not shown).

To effect a measurement, a measuring cell is inserted in each of the cavities 24 and 26, which cells contains the liquid to be investigated and a comparison fluid used for compensation. The electrical connections of the autoclave are connected to a standard measuring apparatus, which can be formed in known manner, as described in the above-mentioned publications. The cooling medium circuit is put into operation, and some pressure medium, e.g. petroleum, is supplied to fill the pressure chamber until excess pressure medium flows along the outflow channel 70, and then the pressure chamber is closed by means of the rupture disc and of the arrangement consisting of the intermediate ring 34, the seal 36 and the clamping ring 14 by the closure and bolting of the bayonet closure 16. Through the pressure medium supply duct pressure medium, e.g. petroleum, is now supplied, until the rupture membrane 32 bursts spontaneously. The rupture pressure depends upon the dimensions of the rupture membrane. For example, with a membrane of Phosphor bronze having a thickness of between 0.5 and 1.0 mm. the pressure could be between about 100 and 200 kg./cm.$^2$. When the rupture disc bursts the pressure falls within 0.05 msec. from the bursting pressure to atmospheric pressure. The pressure jump supplies to the pressure gauge in the cavity 28 an impulse which triggers the time deflection of the oscillograph of the measuring apparatus (not shown).

On the bursting of the rupture disc the rate of flow of the pressure medium through the pressure medium supply duct rises rapidly for a short time and causes the valve 74 to close and stop further flow. This prevents substantial flow into the autoclave of pressure medium whose temperature is not controlled, thereby distorting the measurements through temperature changes.

The embodiment described may be varied in many ways without going beyond the scope of the invention. Instead of the bayonet closure it is also possible to use another quickly-released pressure-resistant closure. According to the nature of the fluids to be investigated the resistance measuring cells may also be made of other materials, e.g. synthetic plastics. The electrodes of the resistance measuring cell may be suited as regards size and material to the measuring task to be performed.

The autoclave described makes fast and accurate measurements possible without the need for the highly skilled personnel hitherto required. Disturbing temperature effects are largely eliminated by means of the valve 74 and the very effective temperature control provided by the chamber 64 and the spiral groove 48 through which the pressure medium flows. On a test only very small amounts of pressure medium are used, as the pressure chamber has a very small volume. The outflow duct 70, 72 permits of a convenient filling of the pressure chamber and, if desired, also a recovery of the pressure medium.

What I claim is:

1. An autoclave for pressure jump measurements comprising a body affording a pressure chamber having an open top closed by a rupture disc which is pressed against the margin of the chamber by a clamping ring held by a readily releasable closure, in which the pressure chamber has a floor spaced from the rupture disc by a narrow gap communicating with a supply of pressure medium, the floor having in it two wells each containing a resistance cell, whereby the volume of said pressure medium subject to relaxation is minimized and the generation of pressure oscillations therein after rupture of said rupture disc is mitigated.

2. An autoclave as claimed in claim 1 in which the readily releasable closure comprises a bayonet joint.

3. An autoclave as claimed in claim 1, in which the floor of said pressure chamber has a further well containing a pressure gauge.

4. An autoclave as claimed in claim 3, in which the floor has a further well containing a temperature gauge.

5. An autoclave as claimed in claim 1, in which the floor forms the bottom of a recess which is formed in the top of the pressure chamber and into which the clamping ring projects, and a pressure medium outflow duct opens out from the lower portion of the said recess in a location adapted to be cut off from the operative part of said pressure chamber when said clamping ring is held by said closure.

6. An autoclave as claimed in claim 1, in which a container, provided with a vent, is mounted on the clamping ring for the collection of the pressure medium released when the rupture disc bursts.

7. An autoclave as claimed in claim 1, including a cooling element surrounding a portion of the pressure chamber body and surrounded by a chamber for cooling medium and forming a spiral groove between the cooling element and said portion of said body which groove provides part of the pressure medium supply duct.

8. An autoclave as claime in claim 1, in which the pressure medium supply duct has in it a valve which closes when the rate of flow through it exceeds a predetermined value.

9. An autoclave as claimed in claim 1, in which the clamping ring is loosely connected with a sealing ring and an intermediate ring when said closure is released.

10. An autoclave as claimed in claim 1, in which the wells containing the resistance measuring cells have internal threads in which the resistance measuring cells are screwed.

11. An autoclave as claimed in claim 1, in which a ring of arcuate raised portions project up from the floor of the pressure chamber body around the wells containing the resistance measuring cells.

References Cited

"Fast Ionic Reactions in Solution . . . ," Streülow et al., Inorganic Chemistry, vol. 2, 1963, pp. 6–10.

DONALD O. WOODIEL, Primary Examiner